W. A. SCHLEICHER.
SNAP HOOK.
APPLICATION FILED OCT. 7, 1907.
898,789.
Patented Sept. 15, 1908.
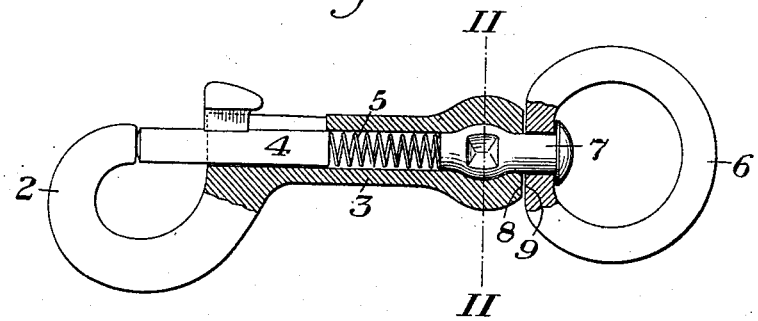
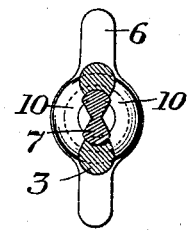
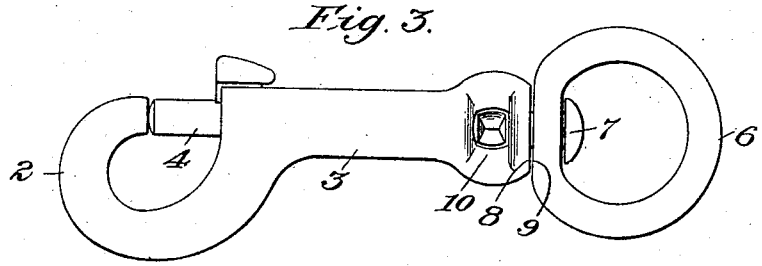
WITNESSES
R. A. Balderson.
W. W. Swartz.
INVENTOR
Wm A. Schleicher,
by Bakewell, Byrnes & Parmelee,
his Attys.

UNITED STATES PATENT OFFICE.

WILLIAM A. SCHLEICHER, OF CLEVELAND, OHIO.

SNAP-HOOK.

No. 898,789.

Specification of Letters Patent.

Patented Sept. 15, 1908.

Application filed October 7, 1907. Serial No. 396,133.

*To all whom it may concern:*

Be it known that I, WILLIAM A. SCHLEICHER, of Cleveland, Cuyahoga county, Ohio, have invented a new and useful Swivel Snap-Hook, of which the following is a full, clear, and exact description, reference being had to the accompanying drawings, forming part of this specification, in which—

Figure 1 is a side view partly in section of a snap hook embodying my invention; and Fig. 2 is a section on the line II—II of Fig. 1; Fig. 3 is a side view of the hook.

My invention has relation to snap hooks of the character usually known as "bolt swivel snaps", and is designed to provide a snap hook of this character which can be cheaply and readily made, and which will provide a strong and secure swivel connection between the hook proper and the swivel loop or ring, the invention being more particularly concerned with the manner in which the stud which forms the swivel connection is secured in the shank of the hook.

Referring to the accompanying drawings, the numeral 2 designates the hook which is formed with a tubular shank portion 3, in which slides the spring tongue or bolt 4.

5 is the spring which normally holds the bolt or tongue in position to close the hook. 6 is the swivel loop or ring, and 7 is the stud which forms the connection between the shank of the hook and the loop of the ring. This shank is formed with a flat surface 8 at its rear end, which provides a bearing for the flattened surface 9 of the loop or ring. Extending into said shank is an aperture, into which the stud 7 is inserted. The shank is cut away at opposite points, as indicated at 10, so that when the stud is inserted into the aperture in the shank opposite sides thereof will be exposed at the cut-away portions 10 to the action of a punch or other suitable tool, by means of which the metal of the stud can be displaced in a manner such as shown in Fig. 2, to thereby secure the stud. This displacement may be effected in various ways. In the drawing I have shown it as being made by the application of a V-pointed punch, by which the metal of the stud is displaced in opposite directions so as to form an offset or head which securely prevents withdrawal of the stud.

In the manner described, the swivel studs can be very quickly and cheaply secured in place and held in such a manner that they cannot work loose or pull out in service.

I do not limit myself, however, to the exact construction which I have shown and described, as it is obvious that changes may be made in the form and construction of the parts and in the manner of displacing the metal of the stud without departing from my invention.

I claim:—

1. In a swivel snap hook, a hook proper having a tubular shank, a loop or eye, and a stud or rivet passed loosely through the end bar of the loop or eye into the opening in the tubular shank and having an enlarged portion in locking engagement with the walls of the opening, substantially as described.

2. In a swivel snap hook, a hook having a tubular shank, a loop or eye, and a stud or rivet passed loosely through the end bar of the loop or eye and into the end of the tubular shank, the latter being recessed or cut away at opposite sides, and the end of the stud or rivet being enlarged at these recessed or cut-away portions and in securing engagement with the walls of the opening, substantially as described.

In testimony whereof, I have hereunto set my hand.

WILLIAM A. SCHLEICHER.

Witnesses:
 ALFRED J. VATERS,
 JOHN MCGRATH.